United States Patent [19]
Streicher

[11] Patent Number: 5,914,776
[45] Date of Patent: Jun. 22, 1999

[54] METHOD FOR AN AUTOMATED VISUAL RANGE MEASUREMENT BY MEANS OF A LIDAR SYSTEM

[75] Inventor: Jurgen Streicher, Munich, Germany

[73] Assignee: Deutsche Forschungsanstalt für Luft-und Raumfahrt e.V., Köln, Germany

[21] Appl. No.: 08/951,501

[22] Filed: Oct. 16, 1997

[30] Foreign Application Priority Data

Oct. 18, 1996 [DE] Germany .................. 196 42 967

[51] Int. Cl.$^6$ .................. G01C 3/08; G01N 21/00
[52] U.S. Cl. .................. 356/5.01; 356/342
[58] Field of Search .................. 356/5.01, 5.08, 356/342

[56] References Cited

U.S. PATENT DOCUMENTS

| | | |
|---|---|---|
| 3,650,627 | 3/1972 | Noxon . |
| 3,782,824 | 1/1974 | Stoliar et al. . |
| 4,397,549 | 8/1983 | Morgan . |
| 4,502,782 | 3/1985 | Werner et al. .................. 356/342 |
| 5,239,352 | 8/1993 | Bissonnette . |
| 5,241,315 | 8/1993 | Spinbirne . |
| 5,267,010 | 11/1993 | Kremer et al. . |
| 5,270,929 | 12/1993 | Paulson et al. . |
| 5,298,905 | 3/1994 | Dahl . |

OTHER PUBLICATIONS

C. Werner, "Slant range visibility determination for lidar signatures by the two–point method", Optics and Laser Technology, Feb. 1981.

B. Evans et al., "The laser cloud mapper and its applications", Laser Radar Technology and Applications, vol. 663, pp. 174–181, 1986.

J. Reagan et al., "Lidar Sensing of Aerosols and Clouds in the Troposphere and Stratosphere", Proceedings of of the IEEE, vol. 77, No. 3, Mar. 1989.

*Primary Examiner*—Stephen C. Buczinski
*Attorney, Agent, or Firm*—Browdy and Neimark

[57] ABSTRACT

For automated visual range measurement by a LIDAR system, a distance measuring range is first determined through repeated evaluation of a voltage level U(R) which indicates the intensity of a threshold value. After random initialization of a start value, the start value is then replaced each time with a new mean visual range, resulting in iterative improvements, and the mean visual range in the determined range is then displayed automatically as soon as the visual range lies within the measuring range of the LIDAR system. Using the Klett method, the accuracy can be determined with the aid of a breaking-off criterion in the form of a threshold value with respect to a deviation percentage between a new and a previous calculation. With this method the deviation can be identified to an order of magnitude of about 10%.

4 Claims, 2 Drawing Sheets

METHOD FOR AN AUTOMATED VISUAL RANGE MEASUREMENT BY MEANS OF A LIDAR SYSTEM

FIELD OF THE INVENTION

The present invention relates to a method for an automated visual range measurement by means of a LIDAR system.

REVIEW OF THE RELATED TECHNOLOGY

LIDAR (LIght Detection And Ranging) constitutes an optical synonym to the commonly known "radar" and describes laser-based remote sensing techniques that can be used to measure atmospheric parameters. A further development of the LIDAR technology via the distance measurement of diffuse scatterers, such as clouds, with the aid of so-called cloud altitude meters has resulted in a system for the range resolved measurement of an atmospheric turbidity with the aid of a visual range (visibility) measuring device. Miniaturization of the LIDAR systems subsequently resulted in compact and hence mobile LIDAR systems which can be housed inside a measurement bus or even a passenger vehicle, or be set up to take measurements from a freeway bridge.

The problem of the danger to the eyes resulting from the high-energy laser beams was eliminated with the implementation of fast-pulsing laser diodes with a low pulse energy emission.

A LIDAR system essentially consists of three main components: a transmitter to emit a laser light, a receiver to collect the backscattered radiation, and converter electronics to produce an interpretable signal from the collected amount of light.

The transmitter emits brief light impulses in the range of several nanoseconds (ns); the light-impulse packages (or, packets) are reflected along their path through the atmosphere by particles such as dust, droplets of water, etc. and return to the receiver after a certain amount of time. Based on this time delay, the range volume in which the scattering took place can be precisely localized down to half the pulse length of the light (back and forth travel). The reflected amount of light received in each range interval then becomes a measure for the number of particles responsible for a turbidity in the atmosphere.

Up to now the evaluation of the obtained measurements could only be performed by a trained expert.

SUMMARY OF THE INVENTION

Accordingly, the present invention has an object, among others, to overcome deficiencies in the prior art such as noted above.

It is therefore the aim of the invention to describe a method by which the respective visual range (visibility) is measured automatically.

This aim is met with a method for an automated visual range measurement by means of a LIDAR system according to the invention.

BRIEF DESCRIPTION OF THE DRAWING

The above and other objects and the nature and advantages of the present invention will become more apparent from the following detailed description of an embodiment[s] taken in conjunction with drawings, wherein.

DETAILED DESCRIPTION OF THE PREFERRED EMBODIMENT

Figure 1:
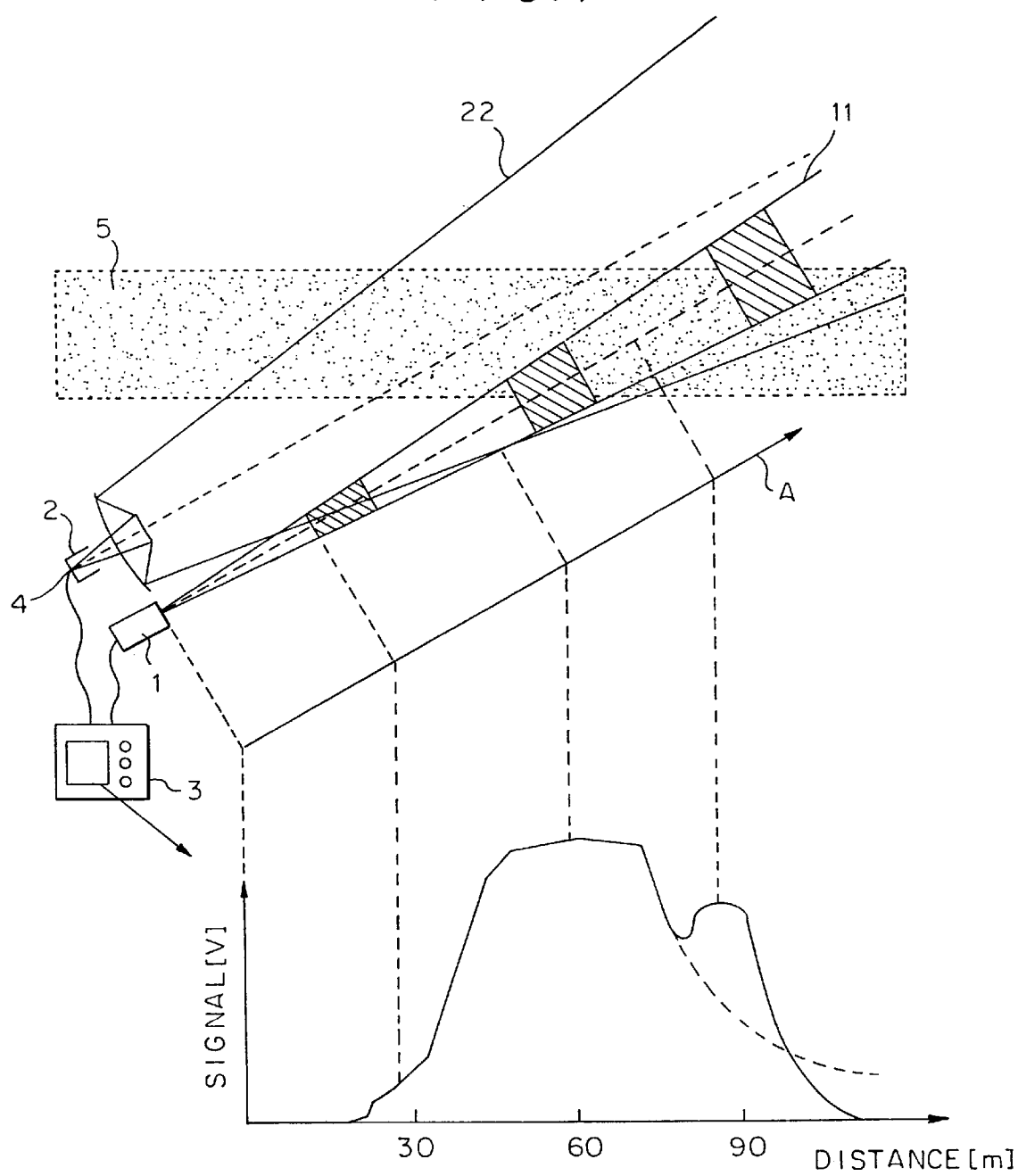
FIG. 1 is a view of the invention.

A LIDAR system according to the present invention includes the usual transmitter 1 to emit a laser light, receiver 2 to collect the backscattered radiation, and converter electronics 3 to produce an interpretable signal from the collected amount of light. The processor 3 is coupled to the receiver and to the transmitter for timing of emitted pulses.

The drawing contains, in its lower portion, a sketched graph of a typical received-light signal, with the voltage (V) of the signal shown on the ordinate and the distance in meters (m) plotted on the abscissa. The distance is proportional to the actual distance from the transmitter 1 because the speed of light is essentially constant; arrow line A indicates schematically the transfer from the beam line distance to the abscissa.

Three events can be identified in this received signal:

a) No radiation can be measured up to a distance of approximately 30 m. The receiver cannot "see" any light from the transmitter because the transmitter cone 11 has not yet entered the reception cone 22. This blind range is based on the opening as well as on the spacing between the transmitter and receiver optics. The pulses are indicated by cross-hatching.

b) At a distance of 60 m, a peak is formed which corresponds to the normal turbidity of the atmosphere and thus to the visual range (visibility).

c) An additional peak appears at 90 m, indicating a layering of the atmosphere, for example in the form of a fog bank, labelled as 5. Without such a layering the signal would have followed the course indicated by the dashed line in the drawing.

As sketched in the drawing, the collected amount of radiation depends on the number of scatterers and the attenuation by the atmosphere, which means the higher the number of scatterers, such as fog droplets, the higher the amplitude of the received signal. However, this quantitative statement is not always sufficient to determine the quality of a backscattering and, consequently, the actual visibility. The backscattering characteristics of the particles would play too large a role in a quantitative measurement of the visibility, i.e. in a measurement of the maximum intensity. A minute triple reflector, acting like a cat's eye, for example, would simulate the presence of a solid wall to the system.

However, the turbidity mentioned above can also be determined via another measurable variable: the attenuation of the atmosphere. Said attenuation is reflected by the negative gradient of the measurement curve, which can also be seen in the drawing. Without the additional turbidity, which may be caused by a fog bank, for example, the measurement curve would follow the dashed line, as mentioned above. The fog bank, however, produces a strong attenuation and hence a steeper decline of the curves.

Analytically, the two values, i.e. the backscatter and the attenuation, may be described with the following equation (1) for the case of a single scattering:

$$U(R) = \frac{k}{R^2} \xi(R) \beta(R) \tau(R)^2 \qquad (1)$$

In equation (1), U(R) denotes a digitized signal (for example from the receiver 2 to the processor 3), R denotes a measuring range, k denotes an instrument constant (which is used to take into consideration the amplification, the emitted laser radiation, etc.), $\xi(R)$ denotes an optical overlap function due to geometry (in the drawing, the close range up to approximately 60 m), β(R) denotes a backscattering from a distance R, and τ(R)² denotes a transparency along the back and forth travel, given by equation (3) below. The attenuation factor is expressed as a squared quantity, because the light travels forth and back on the same path.

The range R is a variable, generally equal to the distance from the transmitter 1 or receiver 2 as determined by the pulse travel time. The quantity U is proportional to the amount of light received, at the light detector 4 of the receiver 3, from a parcel of air bounded a distance R away. For each value of R past the point where the cones 11 and 22 fully overlap, the signal strength is the product of the backscatter and the attenuation. Because the light scattered from a parcel of air at a distance R goes in all directions (not only toward the receiver 2), the quantity U follows the inverse square law, being proportional to 1/R2.

Because of the digitization (sampling), the respective measuring range R is a multiple of a sampling rate $f_s$ of the ADC and half the speed of light (because of the back and forth travel) according to equation (2):

$$R = n\frac{c}{2f_s} \quad (2)$$

where n denotes the sample number, and C is the speed of light.

The transparency of the atmosphere can also be expressed via the attenuation with the following equation (3):

$$\tau(R)^2 = \exp\left(-2\int_{r=0}^{R} \sigma(r)\,dr\right) \quad (3)$$

where σ(r) denotes an attenuation coefficient or extinction at the location r.

In the determination of a visual range (visibility) with the aid of LIDAR technology, a location-resolved measurement of a reception intensity or voltage U(R), respectively, provides the visibility according to equation (4), whereby, however, the visibility is at the same time also contained in the two unknown measurement variables, i.e. in the backscattering in the form of the volume backscatter coefficient β(R), and in the attenuation coefficient (extinction) σ(R):

$$V(R) = \frac{1}{\sigma(R)}\ln\left(\frac{1}{\varepsilon}\right) \quad (4)$$

where V(R) denotes a visibility and ε denotes a contrast threshold value (based on a standard visual range of 2% or a meteorological visibility of 5%, respectively.) Furthermore, the following applies in accordance with equation (5) for the volume backscatter coefficient β(R):

$$\beta(R) = \frac{P}{4\pi}\sigma(R) \quad (5)$$

where P denotes a backscatter phase function which is dependent on the respective scattering medium.

The above equation (1) is then rewritten into a range-adjusted signal, called the signature for an additional calculation according to equation (6):

$$S(R) = \frac{U(R)R^2}{k\xi(R)} = \beta(R)\tau(R)^2 \quad (6)$$

The measured values β and τ are thus separated from the known quantities U, R, k and also ξ, whereby the variable ξ is predetermined by the geometry of the system.

A differentiation of the logarithmic signature and consideration of equation (3), according to the equation (7), results in $$\frac{\partial \ln(S(R))}{\partial R} = \frac{1}{\beta(R)}\frac{\partial \beta(R)}{\partial R} - 2\sigma(R) \quad (7)$$

The solution of the differential equation (7) with consideration of equation (5) then corresponds to equation (8):

$$\sigma(R) = \frac{S(R)}{\frac{S(R_o)}{\sigma(R_o)} - 2\int_{R_0}^{R} S(r)\,dr} \quad (8)$$

where $R_o$ denotes a minimal distance, the beginning of an optical overlap, and σ(R₀) denotes an approximated value for the local extinction in the vicinity of the measuring instrument.

Under certain circumstances the solution of the equation (7) produces very small and sometimes also negative values in the denominator, for example due to noise, which means that the solution is instable.

A stable solution of equation (7) is obtained by transposing the integration thresholds with the aid of the Klett equation (J. D. Klett, Stable Analytic Inversion Solution or Processing LIDAR Returns, Applied Optics 20, 211, 1981) according to equation (9):

$$\sigma(R) = \frac{S(R)}{\frac{S(R_m)}{\sigma(R_m)} + 2\int_{R}^{R_m} S(r)\,dr} \quad (9)$$

where $R_m$ denotes a maximum measuring range (based on the noise level) and σ($R_m$) denotes an estimated value for the local extinction at the end of the measuring range.

A start value (or, starting value), i.e., an estimated value for the extinction, must in this case be determined at the end of the measuring range ($R_m$). While this method in fact contradicts the LIDAR method, i.e., the optical range measurement, it is nevertheless applied since it represents the only stable solution of the equations (1) and (7), respectively. Furthermore, the division results in the elimination of the instrument constant k and the phase function according to equation (5), unless these values are location-dependent.

It is thus possible with the aid of a LIDAR system to measure the visibility or the turbidity of the atmosphere, respectively, with the aid of the attenuation; this, however, under the precondition that the attenuation is not so strong that it immediately fades out the entire radiation.

Although equation (9) does represent the stable solution of equation (7), the calculation of the individual extinction values σ(R), and consequently of the visibility, is strongly influenced by the value S($R_m$)/σ($R_m$).

The received intensity is converted, with a detector 4, to an electrical signal which is first amplified and then digitized. The digital values are fed to a computer of electronics 3 for post-processing.

The implementation of a stable and automated evaluation algorithm requires several analysis steps:

First, a measuring range to be evaluated must be selected from the voltage range U(R) according to equation (1). In the course of this step, the minimum measuring range and specifically the maximum measuring range $R_m$ are determined based on the respective voltage level U(R).

Additionally, the voltages or voltage levels U(R), respectively, are continually compared to a certain threshold value from the beginning of the measuring range, starting with the first sample, until this threshold value is exceeded. The threshold value depends on the instruments, particularly on the amplifier and the analog-digital-converter and also on the optical overlap function.

The voltages or voltage levels U(R), respectively, for the maximum range $R_m$ are then also compared to the same threshold value, however, in this case starting with the last sample. The process is additionally also observed regarding the possible existence of a solid target, such as a wall. If such a solid target exists, the respective scanned values are skipped in the direction of the receiver (the direction in which the sample numbers decline). In this context the number of scanned values depends on both the duration of the impulses, as well as on the receiver bandwidth. The scanned values must be skipped since the inclusion of the solid target voltages would otherwise result in overly high visual range values along the entire measuring range.

Lastly, the interpretable range must also be examined under the criterion whether a sufficient number of measured values exists, i.e. whether the minimum and maximum ranges $R_m$, are spaced far enough apart. Furthermore, a calculation is only performed at all, if at least three measured values exist.

For the determination of the start value $\sigma(R_m)$, said start value is initialized with a first guess value when the instrument is first switched on; in this context it is necessary that a significantly large extinction value, i.e. a short visibility should be chosen. However, this start value must also lie within the measuring range of the system, i.e., the minimum measurable visual range (visibility) is determined by the attenuation and thus by the number of measuring points, whereas the maximum measurable visual range (visibility) is determined by the laser output and the quality of the receiver. The maximum measurable visibility and minimum extinction range to be considered are instrument constants which must be determined prior to using the instrument.

If the instrument has been in operation for some time, i.e. if a previous measurement already exists, the calculation is initialized with the previously determined mean value. A calculation of the visibility or extinction, respectively, is performed with the aid of this start value in a range which has been determined according to the above detailed description.

Averages are then formed from the visibilities, whereby values which lie outside the minimum extinction to be included are discarded, i.e. they are not included. The resulting average is then compared to the start value.

If a typical deviation of, e.g., 10% exists, the calculation is repeated with the average as a new start value until either no (significant) deviation remains, i.e. the deviation is typically less than 10%, or until the loop has been passed too often (if more than, i.e., 10 passes were made).

A calculation and the respective display of the mean visibility depends on the result of the above-described determination of the last start value $\sigma(R_m)$, as well as on the average obtained from the comparison to the last start value. As soon as the deviation between the last start value and the resulting average is smaller than the predetermined threshold value (with a typical deviation of 10%), the average of the previous calculation represents the visibility in the determined range R to $R_m$. This average is then passed on as the start value for the next measurement and calculation. A typical measuring cycle is 0.1 s to 1 s.

If the number of passes which, as explained above, usually lies at 10, has been exceeded but the threshold value has not been reached, both the average, as well as the deviation for this range are displayed. The average is then passed on as the start value for the next measuring cycle.

If the determined average is greater than the maximum visibility, this means that the visual range is outside the measuring range. In this case the start value for the next measuring range is set to the maximum visibility.

The limitations of the above-described method lie in the fact that a sufficient number of scatterers must be present which can be illuminated with the emitted radiation. If a medium is too dense it results in an excessive attenuation of the radiation, also the above equation (1) can no longer be applied since multiple smattering result causes errors depending on the instrument design, orhe measuring range is too far away.

The method according to the invention can only be used for white, spherical scatterers, i.e. for fog, since the equations (4) and (5) cannot be used otherwise. Lastly, the scatters in the range to be measured must be well-mixed. This means that the backscatter phase function according to equation (5) must not vary too greatly.

Figure 2:
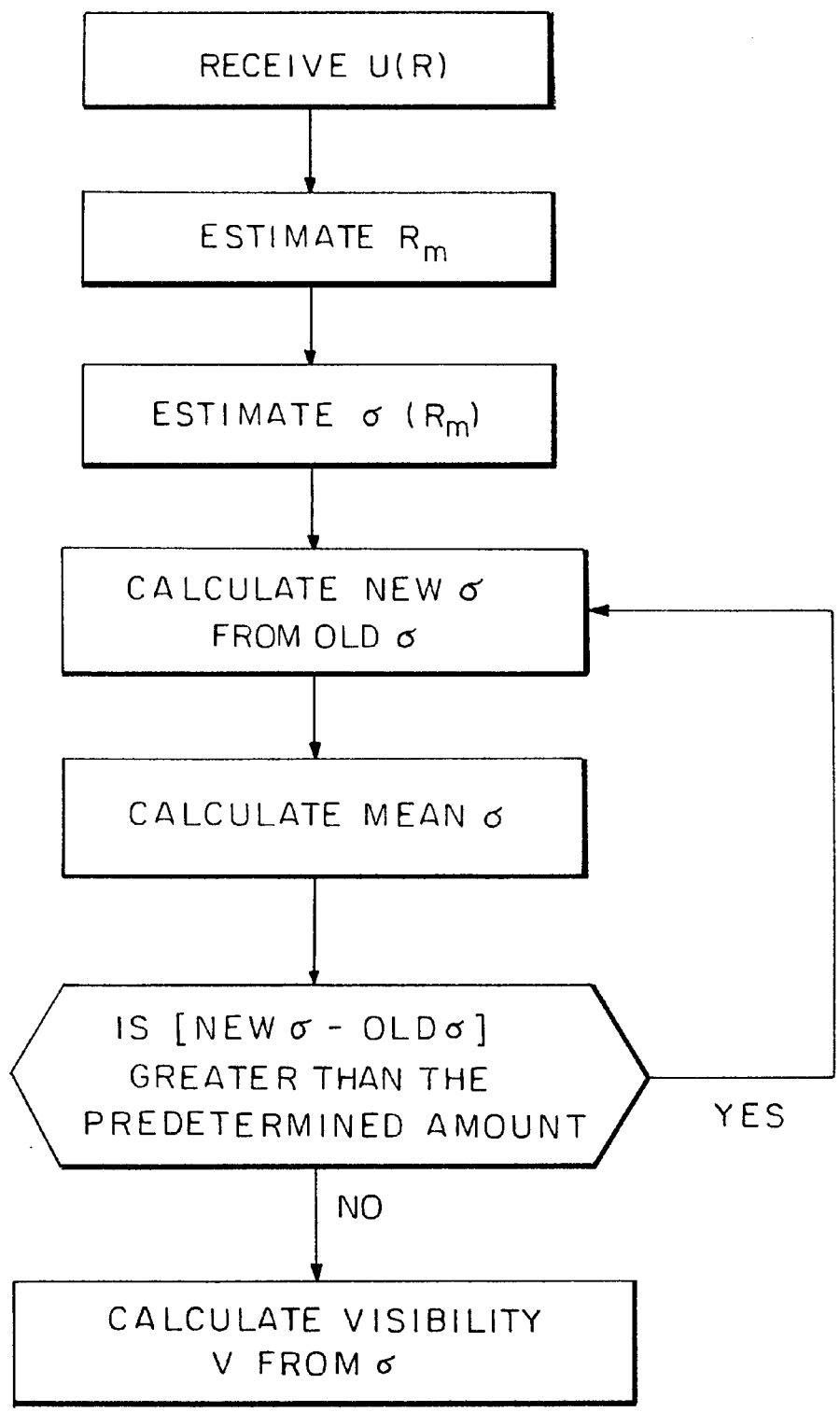
FIG. 2 is a schematic view of the method of the invention.

The steps of the present invention are outlined in FIG. 2, where σ represents the attenuation.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention. Thus the expressions "means to . . . " and "means for . . . " as may be found in the specification above and/or in the claims below, followed by a functional statement, are intended to define and cover whatever structural, physical, chemical or electrical element or structure may now or in the future exist carries out the recited function, whether or not precisely equivalent to the embodiment or embodiments disclosed in the specification above; and it is intended that such expressions be given their broadest interpretation.

What is claimed is:

1. A method for automated measurement of a visibility distance comprising steps of:

providing a LIDAR system including an electronic processor (3), a light beam transmitter (1), and a reflected light beam receiver (2), the receiver outputting a voltage level U(R) proportional to an amount of received light reflected from the atmosphere up to a distance R from the receiver;

(a) on startup, estimating, from a range of detected voltage levels U(R), a maximum measuring range distance $R_m$ over which an algorithm is to be calculated, and estimating an initial starting value of an attentuation coefficient σ(R$_m$);

(b) after startup, repeatedly replacing a previous starting value with a new starting value by iterative steps further comprising
1) calculating a new attentuation coefficient σ(R) according to a Klett equation $$\sigma(R) = \frac{S(R)}{\frac{S(R_m)}{\sigma(R_m)} + 2\int_R^{R_m} S(r)\,dr}$$

where S(R) is a range-adjusted signal proportional to the voltage level U(R),
2) averaging previously calculated attenuation coefficients to obtain a mean attenuation coefficient,
3) taking a difference of the mean attenuation coefficient and the new attenuation coefficient, and
4) repeating the iterative steps if the difference is greater than a predetermined amount; and (c) if the difference is less than a predetermined amount, calculating the visibility distance from the mean attenuation coefficient.

2. The method according to claim 1, including a step of displaying the visibility distance.

3. The method according to claim 1, including a step of displaying a deviation between the initial starting value and the mean attenuation coefficient.

4. A method for automated measurement of a visibility distance comprising steps of:

providing a LIDAR system including an electronic processor (3), a light beam transmitter (1), and a reflected light beam receiver (2), the receiver outputting a voltage level U(R) proportional to an amount of received light reflected from the atmosphere up to a distance R from the receiver;

(a) estimating an initial starting value of at least one quantity related to the visibility distance;

(b) repeatedly replacing a previous starting value with a new starting value by iterative steps further comprising
1) calculating a new vlaue of the quantity,
2) averaging previously calculated quantities to obtain a mean new quantity,
3) taking a difference of the mean quantity and the new quantity, and
4) repeating the iterative steps if the difference is greater than a predetermined amount; and (c) if the difference is less than a predetermined amount, calculating the visibility distance from the mean quantity.

* * * * *